(12) United States Patent
Masuda et al.

(10) Patent No.: US 8,276,044 B2
(45) Date of Patent: Sep. 25, 2012

(54) METHOD FOR APPENDING DATA TO TAPE MEDIUM, AND APPARATUS EMPLOYING THE SAME

(75) Inventors: Setsuko Masuda, Kanagawa (JP); Kenji Nakamura, Kanagawa (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 12/348,796

(22) Filed: Jan. 5, 2009

(65) Prior Publication Data

US 2009/0177947 A1    Jul. 9, 2009

(30) Foreign Application Priority Data

Jan. 8, 2008    (JP) .................................. 2008-01685

(51) Int. Cl.
*G11C 29/00*    (2006.01)
(52) U.S. Cl. ....................................... 714/771
(58) Field of Classification Search ........................ None
See application file for complete search history.

(56) References Cited

U.S. PATENT DOCUMENTS

| | | | |
|---|---|---|---|
| 5,235,601 A * | 8/1993 | Stallmo et al. ................ | 714/766 |
| 5,371,745 A * | 12/1994 | Kiyonaga et al. ............. | 714/758 |
| 5,546,557 A | 8/1996 | Allen et al. | |
| 5,995,306 A * | 11/1999 | Contreras et al. ............... | 360/31 |
| 7,734,986 B2 * | 6/2010 | Gill .............................. | 714/771 |
| 2003/0028840 A1 * | 2/2003 | Sved et al. .................... | 714/771 |
| 2003/0028841 A1 * | 2/2003 | Rushton et al. ............... | 714/781 |
| 2004/0264022 A1 * | 12/2004 | Kimura .......................... | 360/31 |
| 2007/0041117 A1 * | 2/2007 | Saliba ........................... | 360/53 |

FOREIGN PATENT DOCUMENTS

| | | |
|---|---|---|
| JP | 08-045200 | 2/1996 |
| JP | 3436206 | 5/2001 |
| JP | 2002/208217 A | 7/2002 |
| JP | 2004/319030 A | 11/2004 |

OTHER PUBLICATIONS

"Data Interchange on 12, 7mm 384-Track Magnetic Tape Cartridges—Ultrium-1 Format" Standard ECMA-319, Jun. 2001.
U.S. Appl. No. 13/530,047, filed Jun. 21, 2012.

* cited by examiner

*Primary Examiner* — Gabriel Chu
(74) *Attorney, Agent, or Firm* — Zilka-Kotab, PC

(57) ABSTRACT

An information recording apparatus includes a writing system for writing the datasets to the recording medium, so that each of the datasets can be identified from a certain number indicating an order that each of the datasets was sequentially written to the recording medium, and from the number of writing operations (WP) carried out for a dataset of the certain number, the writing system writing a first dataset; the writing system being configured for substantially appending a second dataset onto the first dataset, the second dataset having the same certain number as the first dataset, and for setting a value obtained by incrementing the WP of the first dataset as the WP of the second dataset. A writing control system controls, in the case where an error occurs at the time of the appending, the appending on the first dataset, in a position shifted forward by a predetermined distance from the position of the first dataset on the recording medium, by setting the value obtained by incrementing the WP of the first dataset as the WP for the second dataset, wherein the predetermined distance is a distance with which error correction of the first dataset is avoided by appending the second dataset onto the first dataset so that the second dataset overwrites a part of the first dataset.

20 Claims, 6 Drawing Sheets

RETRY OF WRITING BY SHIFTING POSITION

ASSURANCE OF DATA INTEGRITY (DI)
BY USE OF HIGHER WP

IGNORE DSs HAVING LOWER WPs IN READING SUCCEEDING DSs

MEMORY MAP OF CM (Cartridge Memory)

RECORD OF SUSPENDED APPENDING
(RETRY OF APPENDINGWRITING)

| Suspended Append | Data Set # | NUMBER OF TIMES OF WRITING OPERATION (WP: Writepass) |
|---|---|---|
| 0 | 2 | 2 |
| 1 | 101 | 3 |
| ⋮ | ⋮ | ⋮ |
| 8 | 150 | 5 |
| ⋮ | ⋮ | ⋮ |
| 12 | 206 | 7 |
| 13 | 1005 | 8 |

METHOD FOR APPENDING DATA TO TAPE MEDIUM, AND APPARATUS EMPLOYING THE SAME

RELATED APPLICATIONS

The present application claims the priority of a Japanese patent application filed Jan. 8, 2008 under application number 2008-01685, which is incorporated herein by reference.

BACKGROUND

The present invention relates to a method of appending a dataset onto a dataset already written to a tape medium, and an apparatus such as a magnetic tape device (also referred to as a tape drive below) or portion thereof employing the method.

A large tape drive, such as IBM TS1120, and a tape drive compliant with linear tape open (LTO) sequentially write data to a tape medium in fixed length units called datasets (DS). In response to a reading instruction issued by a host, the tape drive sequentially reads DSs written to the tape. In a tape drive, a tape cartridge is repeatedly used by appending a new DS onto an old DS, instead of deleting the DS written to the tape medium.

FIG. 1 shows a state in which multiple DSs are sequentially written to a tape medium. To "append" a new DS onto a DS already recorded to a tape refers to overwriting the DS recorded to a tape by the new DS. First of all, a tape drive sequentially writes data in DS units to the tape medium while sequentially assigning DS numbers (DS #) to the pieces of data. In the case of appending a DS onto a DS recorded to a tape, it is preferable that the old DS be left on the tape medium and a new DS having the same DS # as the old DS is substantially overwritten thereon.

The lower view in FIG. 1 shows a state in which DSs #1 to #5 are appended. Two types of identification marks including the DS # and a so-called write pass (WP) are assigned to each DS written to the tape. As for writing data, every time the tape drive writes a DS to the tape, the tape drive increments the DS # by one. The WP of each DS indicates the number of times of writing operations. Here, the number of times is increased every time a retry is executed at the occurrence of a write error. When failing to write a DS of DS #X (X being an arbitrary number), the tape drive assigns, to the following DS, a value obtained by increasing the WP, as the WP therefor.

The upper view in FIG. 1 shows a current state of the tape in which each DS is successfully written to the tape, in the initial stage. In the current state, each DS is written only once, and thus the same value (WP 1) is assigned to each of the DSs. In the lower view in FIG. 1, for differentiation, the DSs #1 to #5 used to be appended onto the original DSs #1 to #5 are each assigned a WP 2 obtained by incrementing the WP 1 of each of the original DSs #1 to #5. By using the WP, the tape drive distinguishes a new DS from an old DS among the DSs having the same DS #, appended on a tape, and thus reads the new DS.

For the sake of data integrity (DI), it is preferable that an old DS be completely overwritten by a new DS of the same DS # at the appending operation. However, part of the front and rear ends of an old DS written to a tape remains thereon, due to occurrence of a slight error in writing control of the tape drive. Accordingly, multiple appending operations result in multiple DSs of the same DS # remaining on the tape. When sequentially reading multiple DSs of the same DS #, the tape drive forwards the DS assigned the maximum WP as the newest DS to the host, and assures data integrity (DI).

FIG. 2 illustrates a retry of writing a DS in a position shifted in the tape movement direction (forward), from a position on the tape where an error has occurred in writing an initial DS. Assume a case where there is a scratch, dust or the like on the tape. Here, it is difficult to continuously write DSs on this point of the tape medium by minimizing the spaces between the DSs and giving preference to data recording density. The LTO standards allow the writing position to be shifted for a maximum of 4 m, for instance, to carry out a retry (refer to Ultrium Generation 3 16-Channel Format Specification Document U-316, Revision B, Sep. 7, 2004, which is hereinafter referred to as Non-patent document 1). Here, a WP is incremented for each retry operation. Conventional tape drives employ the technique of carrying out a retry in writing, when an error occurs in writing data to a tape (see Japanese Patent Application Publication No. Hei 8-45200 and Japanese Patent No. 3436206).

By applying the technique of carrying out a retry with position shifting to perform appending, localized dust attachment and scratches due to deterioration with age can be avoided. Hence, permanent errors can be reduced. In the case where an error occurs in appending a DS onto a DS originally recorded to a tape, the appending is retried in a position shifted forward from the posit-on of the original DS. This appending operation is referred to as suspended appending (see Non-patent Document 1). In order to retain existing data while assuring to append a DS onto a DS of the DS # to be changed in one tape cartridge only, it is preferable that the number of permanent errors be reduced at the time of appending. This is because frequent occurrences of permanent errors in appending require needless exchange of tape cartridges and work of backup copy operation for the data (cost and time).

However, assume a case of carrying out a retry by shifting a long distance, that is, to shift from a position of the original DS while jumping over succeeding multiple DSs. Here, in order to assure DI, time is required to identify an old DS from a new DS positioned ahead, having the same DS #. In order to assure DI, a sequential access device (tape drive) is required to first read an old DS of the same DS # and a DS of a succeeding DS #, and then to read an appended DS to identify the newest DS by the WP. Thus, the reading performance of the device is affected.

In the coming years, tape drives may be required to carry out suspended appending in which a dataset is appended onto an existing dataset by shifting the writing position from the position where an error has occurred. Accordingly, it would be desirable to have a method and system for retrying appending so that the reading performance of the device would not be largely influenced even if a DS that was subjected to suspended appending is included.

SUMMARY

An information recording apparatus for sequentially recording, to a recording medium, datasets each including data with a correction code added thereto, and for carrying out error correction, by use of the correction code, on the datasets read from the recording medium is presented. The apparatus includes a writing system for writing the datasets to the recording medium, so that each of the datasets can be identified from a certain number indicating an order that each of the datasets was sequentially written to the recording medium, and from the number of writing operations (WP) carried out for a dataset of the certain number, the writing system writing a first dataset; the writing system being configured for substantially appending a second dataset onto the first dataset, the second dataset having the same certain number as the first dataset, and for setting a value obtained by incrementing the WP of the first dataset as the WP of the second dataset. A writing control system controls, in the case where an error occurs at the time of the appending, the appending on the first dataset, in a position shifted forward by a predetermined distance from the position of the first dataset on the recording medium, by setting the value obtained by incrementing the WP of the first dataset as the WP for the second dataset, wherein the predetermined distance is a distance with which error correction of the first dataset is avoided by appending the second dataset onto the first dataset so that the second dataset overwrites a part of the first dataset.

An information recording apparatus for sequentially recording, to a recording medium, datasets each including data with a correction code added thereto, and for carrying out error correction, by use of the correction code, on the datasets read from the recording medium according to another embodiment includes a writing system for sequentially writing the datasets to the recording medium, so that each of the datasets can be identified from a certain number indicating an order that each of the datasets was written, and from the number of writing operations (WP) carried out for the dataset of the certain number; the writing system being configured for substantially appending, by regarding the dataset written to the recording medium as an old dataset, a new dataset onto the old dataset, the new dataset having the same certain number as the old dataset, and for setting a value obtained by incrementing the WP of the old dataset as the WP of the new dataset. A writing control system controls, in the case where an error occurs at the time of the appending, the appending on the old dataset, in a position shifted forward on the recording medium by a predetermined distance from the position of the old dataset on the recording medium, by setting the value obtained by incrementing the WP of the old dataset as the WP for the new dataset, wherein the predetermined distance is a distance with which error correction of the old dataset is avoided by appending the new dataset onto the old dataset so that the new dataset overwrites a part of the old dataset.

A method for controlling writing and reading of datasets, to be applied to an information recording apparatus for sequentially recording, to a recording medium, datasets each including data with a correction code added thereto, and for carrying out error correction, by use of the correction code, on the datasets read from the recording medium according to one embodiment includes sequentially writing the datasets to the recording medium so that each of the datasets can be identified from a certain number indicating an order that the dataset was written, and from the number of writing operations (WP) carried out for the dataset of the certain number to identify a newest dataset among datasets having the same certain number; substantially appending, by regarding the dataset written to the recording medium as an old dataset, a new dataset onto the old dataset, the new dataset having the same certain number as the old dataset, and for setting a value obtained by incrementing the WP of the old dataset as the WP of the new dataset; and controlling execution, in the case where an error occurs at the time of the appending, of the appending step on the old dataset, in a position shifted forward on the recording medium by a predetermined distance from the position of the old dataset on the recording medium, by setting the value obtained by incrementing the WP of the old dataset as the WP for the new dataset, wherein the predetermined distance is a distance with which error correction of the old dataset is avoided by appending the new dataset onto the old dataset so that the new dataset overwrites a part of the old dataset.

A computer program product is also presented.

BRIEF DESCRIPTION OF THE DRAWINGS

For a more complete understanding of the present invention and the advantage thereof, reference is now made to the following description taken in conjunction with the accompanying drawings.

DETAILED DESCRIPTION

Figure 1:
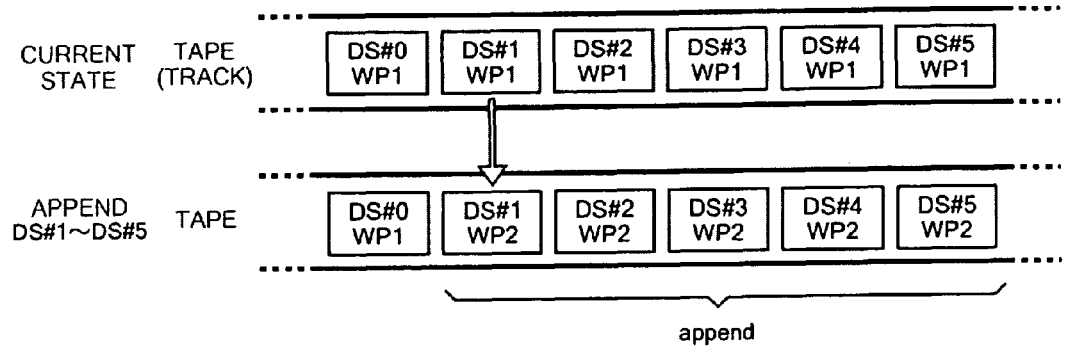
FIG. 1 shows a state in which multiple DSs are sequentially written to a tape medium.
Figure 2:
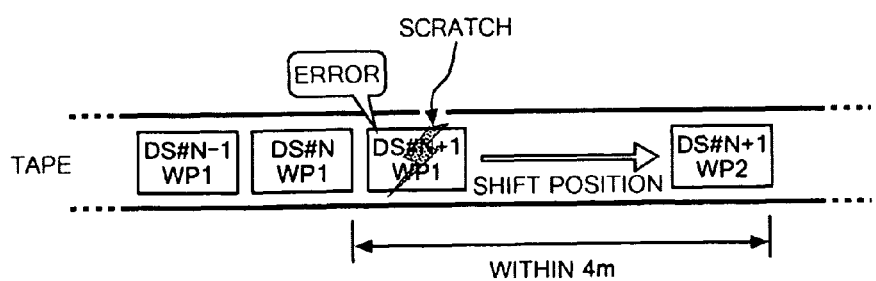
FIG. 2 shows how a retry of writing of a DS is carried out by shifting the position forward from a tape position where a writing error of an original DS has occurred.

Hereinafter, a best mode for carrying out the present invention (referred to as embodiment below) will be described in detail in reference to the accompanying drawings. The invention described in the scope of claims is not limited to the following embodiment.

Various embodiments of the present invention aim to provide an information recording apparatus employing appending and reading control methods, capable of retrying appending of a dataset written to a recording medium by shifting a position onto which a new DS is appended. In addition, various embodiments of the present invention provide appending and reading control methods, capable of retrying appending of a dataset written to a recording medium by shifting a position onto which a new DS is appended. Methodology presented herein according to some approaches reduces the occurrence of permanent errors and the influence thereof on reading performance.

One embodiment of the present invention includes an information recording apparatus for sequentially recording, to a recording medium, datasets each including data with a correction code added thereto, and for carrying out error correction, by use of the correction code, on the datasets read from the recording medium. The recording apparatus includes a writing system for sequentially writing the datasets to the recording medium so that each of the datasets can be identified from a certain number indicating an order that the dataset was written, and from the number of writing operations (WP) carried out for the dataset of the certain number. The writing system is also configured to substantially append, by regarding the dataset written to the recording medium as an old dataset, a new dataset onto the old dataset, the new dataset having the same certain number, and for setting a value obtained by incrementing the WP of the old dataset as the WP of the new dataset. The writing system may include an appending subsystem for providing the appending functionality. A writing control system controls, in the case where an error occurs at the time of the appending, the appending on the old dataset, in a position shifted forward on the recording medium by a predetermined distance from the position of the old dataset on the recording medium, by setting the value obtained by incrementing the WP of the old dataset as the WP for the new dataset. Here, the predetermined distance is a distance with which error correction of the old dataset is avoided by appending the new dataset onto the old dataset so that the new dataset overwrites a part of the old dataset. The predetermined distance is a distance between the positions of the old and new datasets. For example, the predetermined distance in one approach may be equivalent to about 40% to about 70% of the length of the dataset on the tape, but could be higher or lower. A reading system may be used to identify a dataset having the maximum WP as the appended dataset, whereby data integrity is preferably assured without affecting the reading performance of the apparatus.

Another embodiment of the present invention includes an information recording apparatus for sequentially recording, to a recording medium, datasets each including data with a correction code added thereto, and for carrying out error correction, by use of the correction code, on the datasets read from the recording medium. The information recording apparatus includes a writing system for writing the datasets to the recording medium so that each of the datasets can be identified from a certain number indicating an order that the dataset was sequentially written to the recording medium, and from the number of writing operations (WP) carried out for the dataset of the certain number, the writing system writing a first dataset. The writing system is also configured to substantially append a second dataset onto the first dataset, the second dataset having the same certain number as the first dataset, and for setting a value obtained by incrementing the WP of the first dataset as the WP of the second dataset. A writing control system controls, in the case where an error occurs at the time of the appending, the appending on the first dataset, in a position shifted forward by a predetermined distance from the position of the first dataset on the recording medium, by setting the value obtained by incrementing the WP of the first dataset as the WP for the second dataset. Here, the predetermined distance may be a distance with which error correction of the first dataset is avoided by appending the second dataset onto the first dataset so that the second dataset overwrites a part of the first dataset.

In one approach, the information recording apparatus is characterized in that in the case where 10 bytes of Reed-Solomon code is assigned for every 54 bytes of the data as the correction code, the predetermined distance between the positions of the first and second datasets is equivalent to about 30 to about 84% of the length of the dataset.

In another approach, the information recording apparatus includes a reading system for sequentially reading a series of datasets on the recording medium including the appended dataset, and for reading, in the case of reading a dataset having the same certain number as the first dataset, a second dataset having the maximum WP value as the newest dataset.

Yet another embodiment of the present invention includes an information recording apparatus for sequentially recording, to a recording medium, datasets each including data with a correction code added thereto, and for carrying out error correction, by use of the correction code, on the datasets read from the recording medium. The information recording apparatus includes a writing system for sequentially writing the datasets to the recording medium so that each of the datasets can be identified from a certain number indicating an order that each of the datasets was written, and by the number of writing operations (WP) carried out for the dataset of the certain number. The writing system is configured to append, by regarding the dataset written to the recording medium as an old dataset, a new dataset onto the old dataset, the new dataset having the same certain number as the old dataset, and for setting a value obtained by incrementing the WP of the old dataset as the WP of the new dataset; and a writing control system for executing, in the case where an error occurs at the time of the appending, the appending system on the old dataset, in a position shifted forward on the recording medium by a predetermined distance from the position of the old dataset on the recording medium, by setting the value obtained by incrementing the WP of the old dataset as the WP for the new dataset. Here, the predetermined distance is a distance with which error correction of the old dataset is avoided by appending the new dataset onto the old dataset so that the new dataset overwrites a part of the old dataset.

In one approach, the information recording apparatus of the present invention is characterized in that in the case where 10 bytes of Reed-Solomon code is assigned for every 54 bytes of the data as the correction code, the predetermined distance between the positions of the old and new datasets is equivalent to 30 to 84% of the length of the dataset.

In another approach, the information recording apparatus of the present invention is characterized in that the predetermined distance between the positions of the old and new datasets is equivalent to 40 to 70% of the length of the dataset.

In a further approach, the information recording apparatus of the present invention further includes a reading system for sequentially reading a series of datasets on the recording medium including the appended dataset.

In yet another approach, the information recording apparatus of the present invention is characterized in that the reading system reads, among dataset having the same certain number, a dataset having the maximum WP value as the new dataset.

In a further approach, the information recording apparatus of the present invention is characterized in that the writing control system further includes a system for recording, every time a dataset is appended onto an existing dataset by shifting the writing position, the number and the WP for identifying the dataset to a non-volatile memory provided to a cartridge including the recording medium, as information on the dataset subjected to the appending by shifting the writing position.

In one approach, the information recording apparatus of the present invention is characterized in that the reading system reads a target dataset by referring to the information on dataset subjected to appending, the information recorded to the non-volatile memory.

A further embodiment of the present invention is directed to a method for controlling writing and reading of datasets, to be applied to an information recording apparatus for sequentially recording, to a recording medium, datasets each including data with a correction code added thereto, and for carrying out error correction, by use of the correction code, on the datasets read from the recording medium. The method of for controlling writing and reading of datasets includes: sequentially writing the datasets to the recording medium so that each of the datasets can be identified from a certain number indicating an order that each of the datasets was written, and by the number of writing operations (WP) carried out for the dataset of the certain number to identify a newest dataset among datasets having the same certain number; substantially appending, by regarding the dataset written to the recording medium as an old dataset, a new dataset onto the old dataset, the new dataset having the same certain number as the old dataset, and for setting a value obtained by incrementing the WP of the old dataset as the WP of the new dataset; and controlling execution, in the case where an error occurs at the time of the appending, of the appending step on the old dataset, in a position shifted forward on the recording medium by a predetermined distance from the position of the old dataset on the recording medium, by setting the value obtained by incrementing the WP of the old dataset as the WP for the new dataset. Here, the predetermined distance is a distance with which error correction of the old dataset is avoided by appending the new dataset onto the old dataset so that the new dataset overwrites a part of the old dataset.

In one approach, the method for controlling writing and reading of datasets may include sequentially reading a series of datasets on the recording medium including the appended dataset, and of reading, among datasets having the same certain number, a dataset having the maximum WP value as the new dataset.

Figure 3:
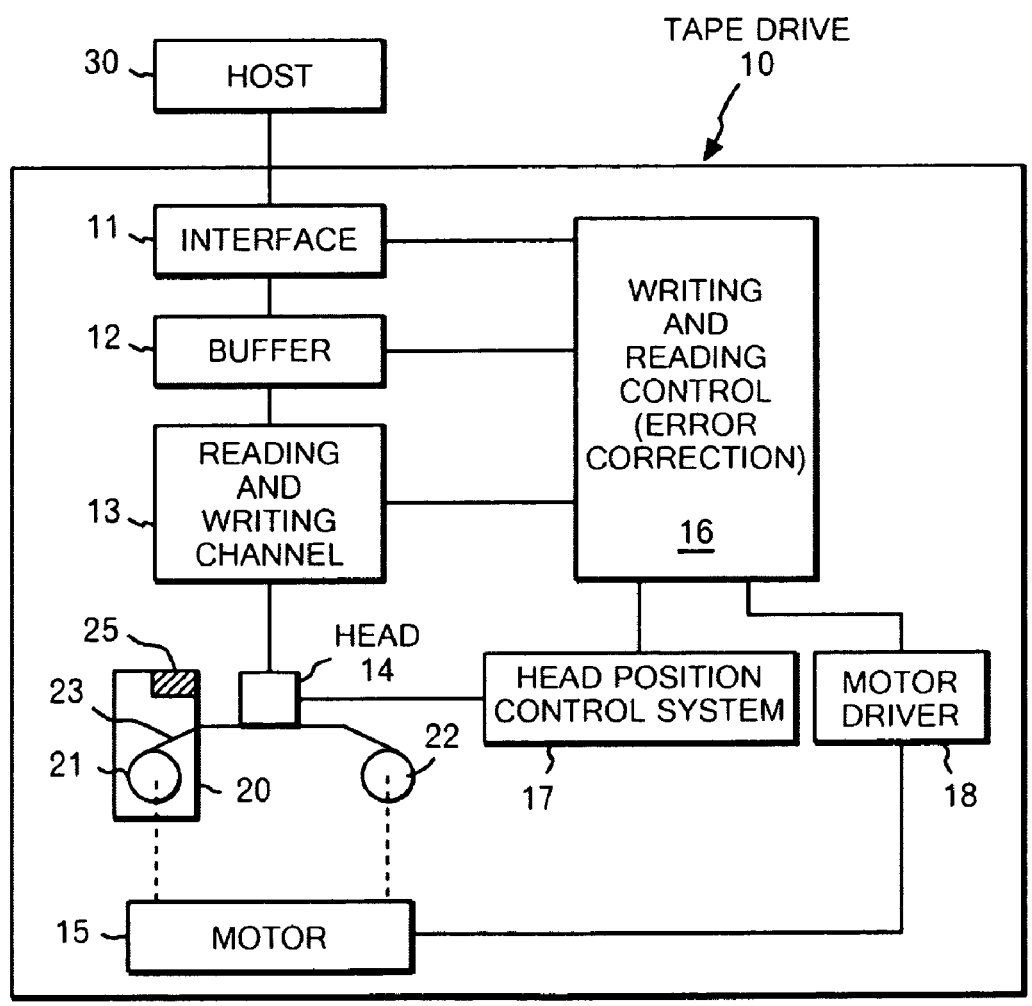
FIG. 3 shows a configuration example of a tape drive 10 to which the present embodiment is applied.

FIG. 3 is a diagram showing a configuration example of a tape drive 10 to which the present embodiment may be applied. An operation flow in which the tape drive 10 writes and appends multiple pieces of data (user data) transmitted from a host 30 to a tape recording medium in fixed-length dataset (DS) units. A DS is a group of multiple pieces of user data, and is a unit of a fixed-length format structure for writing data to a tape. Note that although the present invention may also be applied to cases where a DS is in variable length, the embodiment will be described for the case where the DS is in fixed length.

The tape drive 10 includes an interface 11, a buffer 12, a channel 13, a head 14, a motor 15, and a reel 22 for winding a tape 23. The tape drive 10 also includes a writing and reading control 16, a head position control system 17, and a motor driver 18. Two motors may be provided as the motor 15. Moreover, the tape drive 10 is equipped with a detachable tape cartridge 20.

The tape cartridge 20 includes the tape 23 wound to a reel 21. The tape 23 moves, along with the rotation of the reels 21 and 22, in a longitudinal direction from the reel 21 to 22, or from the reel 22 to 21. The tape 23 may be a tape medium other than a magnetic tape. In order to move the tape to a target position at high speed when reading data, in the tape drive, information on attributes of a tape cartridge (referred to as tape directory) may be stored in a contactless non-volatile memory called a cartridge memory (CM) 25 provided to the tape cartridge. The cartridge memory CM 25 included in the tape 20 is read and written by the tape drive 10 in a contactless manner.

The head 14 writes information to and reads information from the tape 23 when the tape 23 moves in the longitudinal direction. The motor 15 rotates the reels 21 and 22. Although only one motor 15 is illustrated, it is preferable to provide a motor for each of the reels 21 and 22.

The writing and reading control 16 performs control of the entire tape drive 10. For instance, the writing and reading control 16 performs control to write data to the tape 23 or to read data from the tape 23, according to a command received in the interface 11. The writing and reading control 16 also controls the head position control system 17 and the motor driver 18, as well as adds correction codes to write data and carries out error correction on read data. The motor driver 18 drives the motor 15.

The interface 11 communicates with the host 30 which is an example of a higher-level device. The interface 11 receives, from the host 30, a command for moving the tape 23 to a target position, a command instructing to write data to the tape 23, and a command instructing to read data from the tape 23. In the case where SCSI is used as the communication standard, the above commands correspond to a Locate or Space command, a Write command, and a Read command, respectively. In addition, the interface 11 transmits a response indicating whether the processing corresponding to the commands has succeeded or failed, to the host 30. The host 30 issues each of the commands to the tape drive 10 by designating the position and number of variable data.

The buffer 12 is a memory for storing data to be written to the tape 23, and data read from the tape 23. The buffer 12 is configured of a dynamic random access memory (DRAM), for example. Moreover, the buffer 12 is formed of multiple fixed-length buffer segments, and each buffer segment stores a dataset (DS) which is a unit to read and write data to and from the tape 23. A single dataset is configured of a part of data transmitted from the host 30, or multiple pieces of data.

Data received through the reading and writing channel 13 is written to the tape 23 by the head 14 as a DS unit. An error code is added to each DS (400 KB, for example) by the writing and reading control 16 at the time of forwarding the data from the interface 11 to the buffer 12. A DS transmitted from the tape 23 is read by the buffer 12, and is then subjected to error correction by the writing and reading control 16.

Here, a description will be given of the correction capability of the correction code used in the tape drive according to one illustrative embodiment. Data is read from the tape in units of datasets. A dataset (DS) has a data structure of a 2×2 matrix on the buffer 12. A column has a structure in which, e.g., 10 bytes of ECC correction code (redundant information) is added to, e.g., 54 bytes of data. Regarding two adjacent columns as a set, code correction is carried out for, e.g., 128 bytes in which 108 (=54×2) is significant data and 20 (=10×2) is an error correcting code (ECC, also referred to as "correction code" as redundant information). The so-called Reed-Solomon coding may be employed as the correction code. In Reed-Solomon coding, half of redundant data can be corrected for a random error, and the same number of errors as the number of redundant data can be corrected for an error in which error locations are known in advance (erasure correction). Since error locations are known in advance in a tape drive, data can be reconstructed for the number of redundant data. In other words, if 108/128 of the original data can be read, the entire original data can be reconstructed.

Figure 4:
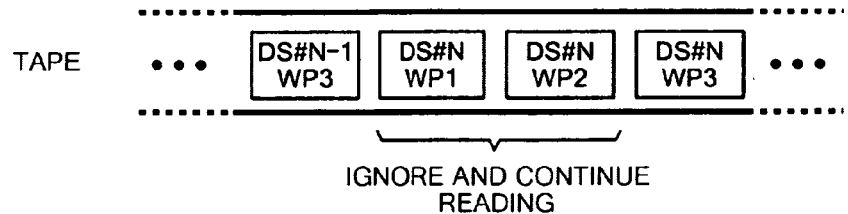
FIG. 4 shows a state in which three DSs of the same DS #N are appended onto one another, each of the DSs overlapping an older one therebelow.

First, with reference to examples of DS appending carried out by the above tape drive (FIGS. 4 and 5), a description will be given on how the appending by use of the present invention does not influence the performance of the device, because the number of writing operations (WP) is checked at the time of reading the DS. FIG. 4 shows a state under the assumption that three DSs of the same DS # are appended onto one another, each of the DSs completely overlapping an older one therebelow. When reading data, the tape drive reads the data in the order of the DS #s. In the case where multiple DSs of the same DS # exist, the tape drive reads the data of the DS having the largest WP.

Moreover, when reading the DSs sequentially, the tape drive reads a DS having a certain WP, and then neglects a DS having a lower WP (since this is obsolete data) thereafter, and continues to read the DSs. For example, in the case of reading DS #N, the tape drive reads three DS #N having WPs 1, 2 and 3, respectively. In the case where the WP value of DS #N−1 written to the tape is 3, the tape drive neglects DSs having WPs lower than 3, that is WP1 and WP2, and only refers to DSs of the DS #N having WP3. Hence, the reading performance of the device is not affected.

Figure 5:
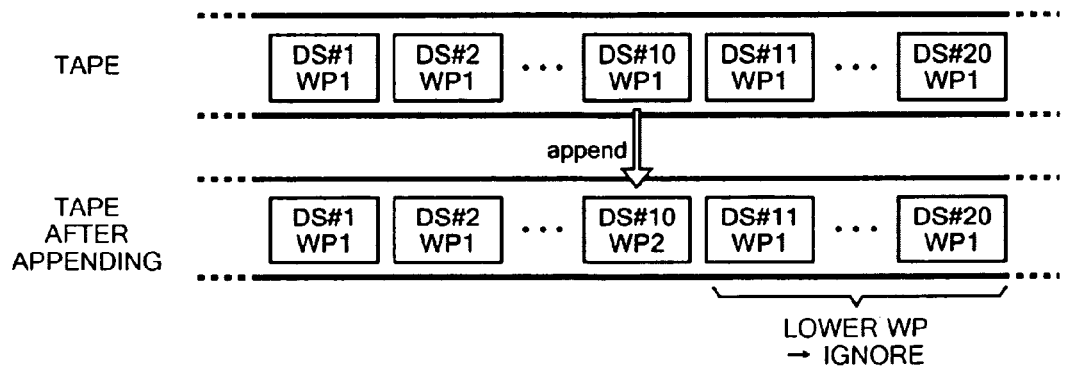
FIG. 5 shows, in the upper view, a state in which DSs of DS #1 to 20 are written to a tape, and also shows, in the lower view, a state in which a DS of DS #10 is appended onto the existing DS of DS #10.

FIG. 5 shows a state in which DSs #1 to #20 are firstly written to the tape (upper view), and then a DS of DS #10 is appended onto the existing DS of DS #10 (lower view). The tape drive reads data sequentially by neglecting the DSs (DS #11 to #20) subsequent to the appended DS of DS #10. As to reading of the DSs of DS #10 to #20, the tape drive identifies the appended DS of DS #10 from an old DS of DS #10 (WP 1) by assigning WP 2 to the appended DS of DS #10. After the DS of DS #10 has been appended (lower view), the tape drive neglects the originally-written DSs of DS #11 to #20, at the time of reading the DSs. In this case, even if the DSs of DS #11, 12, . . . exist on the tape, the tape drive regards that the DSs of DS #10 and later do not exist since the WP of the old DSs #11, 12, . . . is lower than the WP of the appended DS #10. Accordingly, the reading performance of the device is similarly unaffected in the example in FIG. 5, as well as DI is assured so that error transmission of data included in an old dataset can be avoided.

Figure 6:
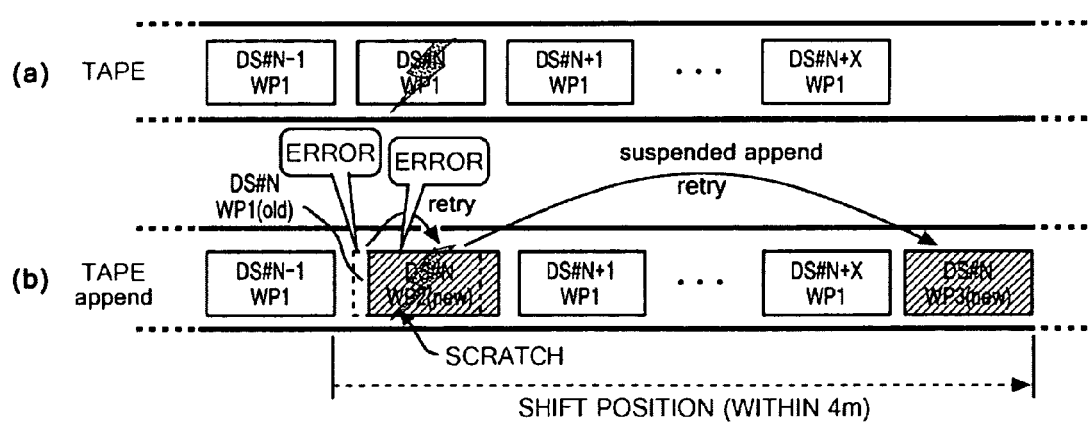
FIG. 6 shows a DI problem caused when appending a DS onto an existing DS by shifting the writing position thereof.

Next, a description will be given on how the execution of a retry of appending by largely (e.g., approximately 4 m) shifting the position from an error position, affects the reading performance of the device for assurance of DI. FIG. 6 shows the DI problem occurring in the case where a retry of appending is carried out by shifting the writing position to a large extent. FIG. 6A shows a current state in which the DSs of DS #N−1 to #N+X written to the tape all have WP1. In FIG. 6B, an error is caused by a scratch on the tape when trying to append a DS #N onto the existing DS #N in the state of FIG. 6A, and thus a retry (WP 2) of the appending is carried out. Then, since the appending operation in the position of the original DS #N ends in an error (WP 2) because of the scratch, a new DS #N (WP 3) is finally written by suspended appending to a position shifted for approximately 4 m, to avoid the scratch.

In the case where the DSs are written as in FIG. 6B, the tape drive cannot help reading the DS of the old DS #N (WP 1) instead of the data of the new DS #N (WP 3), in an attempt to sequentially read from DS #N−1 to #N. That is, the DI problem occurs in which the tape drive reads and transmits the old DS #N to the host. In order to avoid the DI problem, the tape drive needs to check, before transmitting each DS to the host, that there is no DS having the same DS # and having a higher WP within 4 m distance while reading data in the state of FIG. 6B. The fact that data needs to be read in such a manner indicates that the retry of appending by shifting the writing position to a position beyond the following DS #N+1, N+2, . . . is unrealistic in performance.

Figure 7:
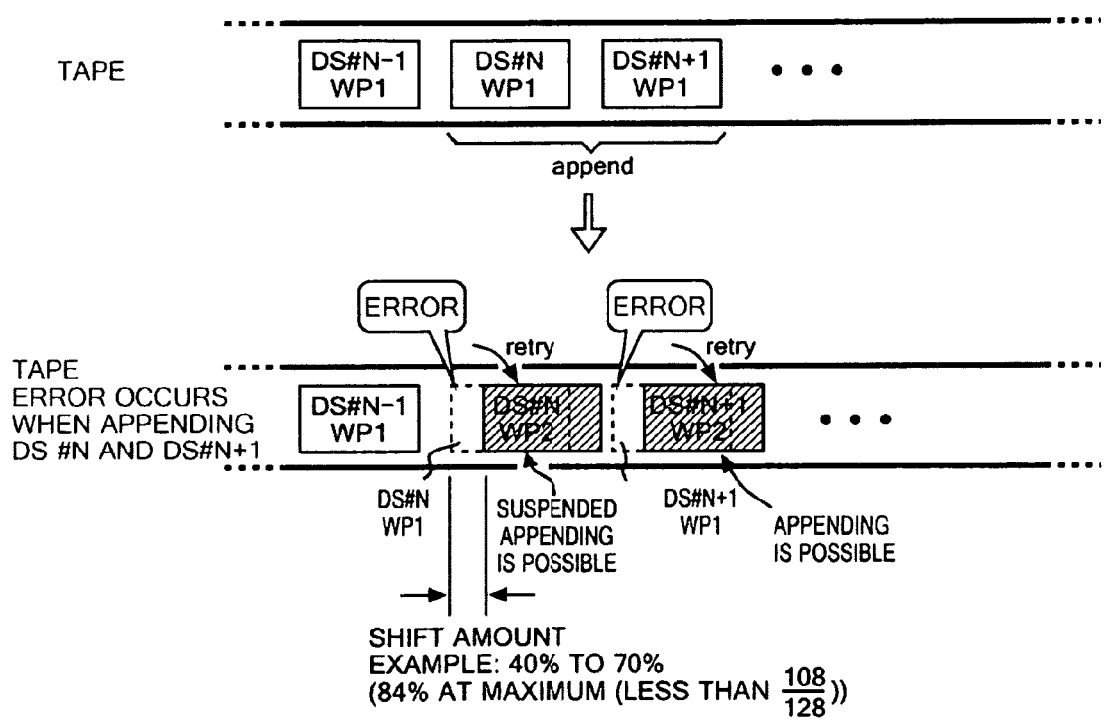
FIG. 7 show a state in which, on performing appending on DS #N, #N+1, . . . , a retry of writing (suspended appending) is carried out by shifting the position by approximately 50% of the DS length to avoid a small scratch on the tape.

An embodiment of the present invention is, in carrying out a retry of appending by shifting the writing position (suspended appending), suppressing the actual shift amount of the writing position to approximately half the length of a DS. FIG. 7 shows a state in which DS #N, #N+1, are appended by carrying out a retry on a position shifted for approximately 40% to 70% of the DS length to avoid a small scratch on the tape medium. In the appended state in FIG. 7, the new DS #N, #N+1, . . . are assigned with WP2.

At the time of reading the appended state in FIG. 7, the writing and reading control 16 refers to WP 2 for checking the new DS #N and #N+1. The tape drive is capable of retrying the appending by shifting from the position of an old DS (WP1) having the same DS # as the new DS (WP 2) to a maximum of not more than 84% (less than 108/128) of the DS length. If a DS is appended by shifting the writing position by approximately 40% to 70% of DS length in the tape movement direction in consideration of the operational error margin of the tape drive, the old DS cannot be reconstructed by correction.

By thus carrying out appending with a new DS so that an old DS cannot be reconstructed, the DI problem can be avoided because the old DS cannot be read even if there is difficulty in reading the new DS. Accordingly, the DI problem of transmitting old data to the host does not occur when the tape drive sequentially reads, as in a conventional case, the tape medium appended in the manner shown in FIG. 7.

The tape drive can reduce the occurrence of permanent errors by writing a DS to a position shifted from the original position to avoid small scratches on a tape medium. The amount of shift in the writing position is equal to approximately the latter half of the original DS at most. In this case, only 50% being the first half of the data region of the old DS is left on the tape. When only less than 50% of the original DS is left on a tape, the correction capability of an ECC becomes ineffective, assuring that the old DS cannot be reconstructed. In other words, with the correction capability of an ECC according to the LTO standards, an old DS is prevented from being reconstructed if a data region of more than 16% of the latter half of the DS is overwritten by a new DS by shifting a writing position approximately 84% of the DS length forward from an original position.

Moreover, in the appended state in FIG. 7, the new DS is appended onto the old DS in such a manner that the latter half of the region on the tape of the old DS having the same DS # would be overwritten by the new DS, so that the new DS is recorded subsequent to the old DS. Thus, no DS having a successive number (DS #) is interposed between regions on the tape of the old DS and the new DS of the same DS #. By employing this configuration, the tape drive can check a new DS for assurance of DI without largely affecting the reading performance of the device.

Figures 8, 9:
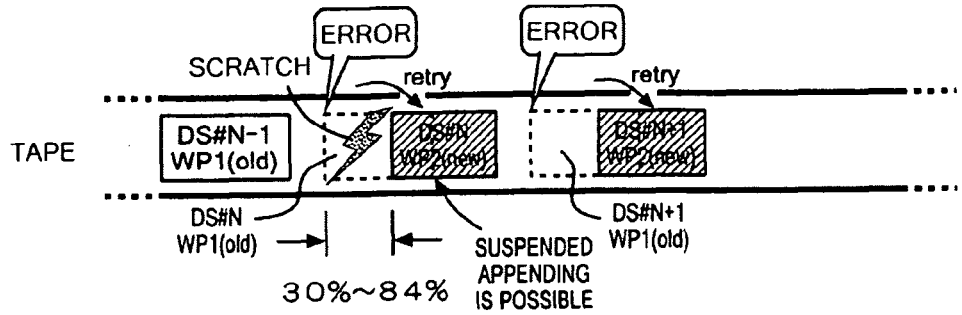
FIG. 8 shows an example of writing a DS to a position shifted from an old DS in the case where an error occurs in appending a DS #N onto an existing DS #N.
FIG. 9 shows a table, in which multiple suspended appending operations are registered, from among memory maps of a CM.

FIG. 8 shows an example of writing a DS to a position shifted from an older DS, in the case where an error occurs at the time of appending a DS #N onto an existing DS #N. The new DS is appended onto the old DS, so that the maximum value of the actual shift amount of the writing position becomes 84% of the DS length (less than 108/128). If a portion on an old DS overwritten by the new DS is not more than 84% at the first half of the old dataset, the tape drive does not read the old DS even when the newest DS cannot be read at all because of a scratch. If there is a scratch on a region of an old DS on the tape, a DS can often be appended onto the old DS while avoiding the scratch in the region of the original DS by shifting the tape position forward by 30% to 84% of the DS length, from the position of the original DS. When an appending error occurs in a position of an old DS, occurrence of a permanent error can be avoided by appending a new DS onto the old DS by shifting the tape position forward within the above-mentioned range. This configuration also assures data integrity at the time of reading data.

The DI problem does not occur even if the tape drive is unable to determine, at the time of reading data, whether a retry of appending has been carried out by shifting the writing position forward within the range of the present embodiment. Additionally, occurrence of permanent errors in appending can be reduced, because a shift by approximately half a DS length (that is, approximately 5 cm) is enough in many cases for avoiding a small scratch on a tape medium.

FIG. 9 shows a table, in which multiple suspended appending operations are registered, from among memory maps of a CM. In the case where a retry of appending by shifting the writing position is carried out, the tape drive may record, to a CM (cartridge memory), information on the DS subjected to suspended appending through the retry (Non-patent Document 1). In order to avoid the problem that data cannot be appended because of a scratch, an appending scheme may be employed in which the fact of shifting the writing position at the time of appending, is recorded to the CM provided to a tape cartridge. The LTO standards, for instance, allow information on a DS appended by shifting the writing position by a maximum of 4 m (suspended appending) to be recorded to a CM, up to a limit of 14 positions. ADS subjected to suspended appending is recorded in the CM with the newest WP value added thereto.

If information of suspended appending is recorded in the CM, a tape drive can check whether a new DS #N exists after an old DS #N by referring to the CM at the time of reading the old DS #N. Accordingly, the tape drive can read the new DS #N (WP 2) and transmit the new DS to a host, even if the old DS #N (WP 1) is left on the tape from shifting the writing position in appending. Thus, by referring to the CM, the tape drive can transmit the newest DS of an arbitrary DS #N.

However, if a DS is appended onto an old DS so that only 84% or less of the old DS is left as in the present embodiment, a tape drive does not need to refer, at the time of reading data, to information previously recorded to a CM at the time of writing the data. Previously written data needs to be read, even when the CM is inaccessible due to a CM reading error in the tape drive or a failure in the CM or the tape cartridge. In the conventional scheme in which the writing position is largely shifted in appending data, there has been a drawback that the general reading performance of the device is deteriorated, in an attempt to avoid the DI problem while reading data when the CM is inaccessible.

Hereinabove, control methodology for a sequential device such as a tape drive for writing data to a tape has been disclosed according to various embodiments of the present invention. Some or all of such embodiments are capable of reducing the occurrence of permanent errors at the time of appending data onto old data, and of lessening requirements for needless exchange of tape cartridges, in the case where a DS is appended onto a DS already recorded to a tape. In addition, by employing embodiments of the present invention, the operation for reading the DSs does not affect the reading performance of the device while assuring the DI.

Assume a case where a tape drive is unable to access a CM although the CM is supposed to be used to read data. By applying aspects of the foregoing methodology to such a case, an advantageous effect can be achieved of avoiding the DI problem at the time of reading, and securing the reading performance of the device. At the same time, the occurrence of appending error in the tape drive can be reduced without affecting the reading performance of the device.

It is obvious to those skilled in the art that various modifications and improvements can be added to the above-mentioned embodiment. Embodiments obtained by adding such modifications and improvements are included in the technical scope of the present invention, as a matter of course. For instance, although a dataset is assumed to have fixed length as a unit written to a tape medium in above-described embodiment, the case of a dataset having variable length is also included in the technical scope of the present invention.

In appending a DS onto a DS already recorded to a tape, the present invention lowers the rate of permanent error occurrences at the time of appending, as well as reduces needless exchange of tape cartridges and the need of a backup copy. Moreover, at the time of reading data, the present invention assures DI while avoiding to influence the reading performance of an access device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An information recording apparatus for sequentially recording, to a recording medium, datasets each including data with a correction code added thereto, and for carrying out error correction, by use of the correction code, on the datasets read from the recording medium, the apparatus comprising;
   a writing system for writing the datasets to the recording medium, so that each of the datasets can be identified from a certain number indicating an order that each of the datasets was sequentially written to the recording medium, and from the number of writing operations (WP) carried out for a dataset of the certain number, the writing system writing a first dataset;
   the writing system being configured for appending a second dataset onto the first dataset, the second dataset having the same certain number as the first dataset, and for setting a value obtained by incrementing the WP of the first dataset as the WP of the second dataset; and
   a writing control system for controlling, in the case where an error occurs at the time of the appending, the appending on the first dataset, in a position shifted forward by a predetermined distance from the position of the first dataset on the recording medium, by setting the value obtained by incrementing the WP of the first dataset as the WP for the second dataset, wherein
   the predetermined distance is a distance with which error correction of the first dataset is avoided by appending the second dataset onto the first dataset so that the second dataset overwrites a part of the first dataset.

2. The apparatus according to claim 1, wherein in the case where 10 bytes of Reed-Solomon code is assigned for every 54 bytes of the data as the correction code, the predetermined distance between the positions of the first and second datasets is equivalent to 30 to 84% of the length of the dataset.

3. The apparatus according to claim 1, further comprising a reading system for sequentially reading a series of datasets on the recording medium including the appended dataset, and for reading, in the case of reading a dataset having the same certain number as the first dataset, a second dataset having the maximum WP value as the newest dataset.

4. An information recording apparatus for sequentially recording, to a recording medium, datasets each including data with a correction code added thereto, and for carrying out error correction, by use of the correction code, on the datasets read from the recording medium, the apparatus comprising:
   a writing system for sequentially writing the datasets to the recording medium, so that each of the datasets can be identified from a certain number indicating an order that each of the datasets was written, and from the number of writing operations (WP) carried out for the dataset of the certain number;
   the writing system being configured for appending, by regarding the dataset written to the recording medium as an old dataset, a new dataset onto the old dataset, the new dataset having the same certain number as the old dataset, and for setting a value obtained by incrementing the WP of the old dataset as the WP of the new dataset; and
   a writing control system for controlling, in the case where an error occurs at the time of the appending, the appending on the old dataset, in a position shifted forward on the recording medium by a predetermined distance from the position of the old dataset on the recording medium, by setting the value obtained by incrementing the WP of the old dataset as the WP for the new dataset, wherein
   the predetermined distance is a distance with which error correction of the old dataset is avoided by appending the new dataset onto the old dataset so that the new dataset overwrites a part of the old dataset.

5. The apparatus according to claim 4, wherein in the case where 10 bytes of Reed-Solomon code is assigned for every 54 bytes of the data as the correction code, the predetermined distance between the positions of the old and new datasets is equivalent to 30 to 84% of the length of the dataset.

6. The apparatus according to claim 5, wherein the predetermined distance between the positions of the old and new datasets is equivalent to about 40% to about 70% of the length of the dataset.

7. The apparatus according to claim 4, further comprising a reading system for sequentially reading a series of datasets on the recording medium including the appended dataset.

8. The apparatus according to claim 7, wherein the reading system reads, among datasets having the same certain number, a dataset having the maximum WP value as the new dataset.

9. The apparatus according to claim 8, wherein the writing control system further comprises a system for recording, every time a dataset is appended onto an existing dataset by shifting the writing position, the number and the WP for identifying the dataset to a non-volatile memory of a cartridge including the recording medium, as information about the dataset subjected to the appending by shifting the writing position.

10. The apparatus according to claim 9, wherein the reading system reads a target dataset by referring to the information about the dataset subjected to the appending.

11. A method for controlling writing and reading of datasets, to be applied to an information recording apparatus for sequentially recording, to a recording medium, datasets each including data with a correction code added thereto, and for carrying out error correction, by use of the correction code, on the datasets read from the recording medium, the method comprising:
  sequentially writing the datasets to the recording medium so that each of the datasets can be identified from a certain number indicating an order that the dataset was written, and from the number of writing operations (WP) carried out for the dataset of the certain number to identify a newest dataset among datasets having the same certain number;
  appending, by regarding the dataset written to the recording medium as an old dataset, a new dataset onto the old dataset, the new dataset having the same certain number as the old dataset, and for setting a value obtained by incrementing the WP of the old dataset as the WP of the new dataset; and
  controlling execution, in the case where an error occurs at the time of the appending, of the appending step on the old dataset, in a position shifted forward on the recording medium by a predetermined distance from the position of the old dataset on the recording medium, by setting the value obtained by incrementing the WP of the old dataset as the WP for the new dataset, wherein
  the predetermined distance is a distance with which error correction of the old dataset is avoided by appending the new dataset onto the old dataset so that the new dataset overwrites a part of the old dataset.

12. The method according to claim 11, further comprising sequentially reading a series of datasets on the recording medium including the appended dataset.

13. The method according to claim 12, further comprising reading, among datasets having the same certain number, a dataset having the maximum WP value as the new dataset.

14. The method according to claim 13, further comprising recording, every time a dataset is appended onto an existing dataset by shifting the writing position, the number and the WP for identifying the dataset to a non-volatile memory of a cartridge including the recording medium, as information about the dataset subjected to the appending by shifting the writing position.

15. The method according to claim 14, wherein the reading step reads a target dataset by referring to the information about the dataset subjected to the appending.

16. A computer program product for controlling writing and reading of datasets, to be applied to an information recording apparatus for sequentially recording, to a recording medium, datasets each including data with a correction code added thereto, and for carrying out error correction, by use of the correction code, on the datasets read from the recording medium, the computer program product comprising:
  a non-transitory computer usable medium having computer usable program code embodied therewith, the computer usable program code comprising:
  computer usable program code configured to sequentially write the datasets to the recording medium so that each of the datasets can be identified from a certain number indicating an order that the dataset was written, and from the number of writing operations (WP) carried out for the dataset of the certain number to identify a newest dataset among datasets having the same certain number;
  computer usable program code configured to append, by regarding the dataset written to the recording medium as an old dataset, a new dataset onto the old dataset, the new dataset having the same certain number as the old dataset, and for setting a value obtained by incrementing the WP of the old dataset as the WP of the new dataset; and
  computer usable program code configured to control execution, in the case where an error occurs at the time of the appending, of the appending step on the old dataset, in a position shifted forward on the recording medium by a predetermined distance from the position of the old dataset on the recording medium, by setting the value obtained by incrementing the WP of the old dataset as the WP for the new dataset, wherein
  the predetermined distance is a distance with which error correction of the old dataset is avoided by appending the new dataset onto the old dataset so that the new dataset overwrites a part of the old dataset.

17. The computer program product according to claim 16, further comprising computer usable program code configured to sequentially read a series of datasets on the recording medium including the appended dataset.

18. The computer program product according to claim 17, further comprising computer usable program code configured to read, among datasets having the same certain number, a dataset having the maximum WP value as the new dataset.

19. The computer program product according to claim 18, further comprising computer usable program code configured to record, every time a dataset is appended onto an existing dataset by shifting the writing position, the number and the WP for identifying the dataset to a non-volatile memory of a cartridge including the recording medium, as information about the dataset subjected to the appending by shifting the writing position.

20. The computer program product according to claim 19, wherein the computer usable program code configured to read reads a target dataset by referring to the information about the dataset subjected to the appending.

* * * * *